United States Patent
Matz et al.

(10) Patent No.: US 6,198,511 B1
(45) Date of Patent: Mar. 6, 2001

(54) IDENTIFYING PATTERNS IN CLOSED CAPTION SCRIPT

(75) Inventors: David J. Matz, Hillsboro; James P. Ketrenos, Beaverton, both of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/150,591

(22) Filed: Sep. 10, 1998

(51) Int. Cl.[7] ................................................. H04N 5/76
(52) U.S. Cl. .................. 348/553; 348/7; 348/10; 348/13; 348/473; 348/569
(58) Field of Search ................... 348/468, 465, 348/461, 473, 467, 476, 477, 478, 552, 553, 564, 569, 906, 10, 7, 12, 13; 455/4.1, 4.2; 709/217, 220, 249; 358/1.1, 1.15; H04N 5/76

(56) References Cited

U.S. PATENT DOCUMENTS

| | | | |
|---|---|---|---|
| 5,543,850 | * 8/1996 | Pratt | 348/564 |
| 5,666,293 | * 9/1997 | Metz | 348/10 |
| 5,768,539 | * 10/1999 | Metz | 348/10 |
| 5,835,667 | * 11/1998 | Wactlar | 386/97 |
| 5,867,223 | * 2/1999 | Schindler | 348/552 |
| 5,903,892 | * 5/1999 | Hoffert | 345/327 |
| 5,907,366 | * 5/1999 | Farmer | 348/6 |
| 5,951,639 | * 9/1999 | MacInnis | 348/10 |
| 5,970,220 | * 10/1999 | Bolash | 395/114 |
| 5,978,555 | * 11/1999 | Inoue | 395/109 |

OTHER PUBLICATIONS

Rob Fixmer, "More About Web TV: Ambitious New Card," The New York Times on the Web, Personal Computing, Aug. 25, 1998.
All–in–Wonder™, All–in Wonder Pro™, Installation and Setup, User's Guide, Version 1.0, P/N 107–70047–10 Rev. A, ATI Technologies, Inc., 1997, pp. 6–7 and 44–45.

* cited by examiner

Primary Examiner—Jeffrey Brier
Assistant Examiner—Wesner Sajous
(74) Attorney, Agent, or Firm—Trop Pruner & Hu, P.C

(57) ABSTRACT

An interactive broadcast may include television programming and associated services such as closed caption scripts. The audio portion of the broadcast television programming, in closed caption script format, is parsed and compared to a key word database which may be preprogrammed by the user. The closed caption text may be displayed in real time. When a match is identified, an event is fired. The particular event which occurs and the key word may be programmed by the user.

21 Claims, 3 Drawing Sheets

IDENTIFYING PATTERNS IN CLOSED CAPTION SCRIPT

BACKGROUND

This invention relates generally to interactive broadcasting which involves broadcasting television programming together with web content information.

Interactive broadcasting allows a television program to be coupled with other data services such as closed caption transcription services. The closed caption transcription may be streamed to the television receiver together with the television programming information. Generally, closed caption information is assigned a specific number of lines in the vertical blanking interval (VBI) and necessarily accompanies airwave television broadcasts. In addition, the closed caption information may be transmitted over cable and satellite systems together with the television programming. The closed caption information generally corresponds to a typed transcript of what is being said in the accompanying television program.

In an existing interactive broadcast system such as Intel's Intercast® Viewer 1.0, the closed caption information may be streamed together with the television programming and stored in a media library in the interactive broadcasting software of a receiving computer system. The receiving computer system could be, for example, a normal computer system with a television capture card or a set top computer which uses a television receiver to display television programming.

Interactive broadcasting is advantageous since the web content which accompanies the television program allows the user to interact with the television programming. This may mean that the user may respond over back channels to the television broadcaster. It also means that the user can use information conveyed in the web content portion of the broadcaster to better utilize the television programming.

It would be desirable to enable a computer receiver of an interactive broadcast to respond to the audio content of a television program automatically. This would enable the television viewer to interact in an active way with the television programming content.

SUMMARY

In accordance with one embodiment, a method of monitoring closed caption script accompanying a television program involves parsing a closed caption script. The parsed closed caption script is compared to a search word. A programmable selectable event is generated when a word in the closed caption script matches a search word.

DETAILED DESCRIPTION

Figure 1:
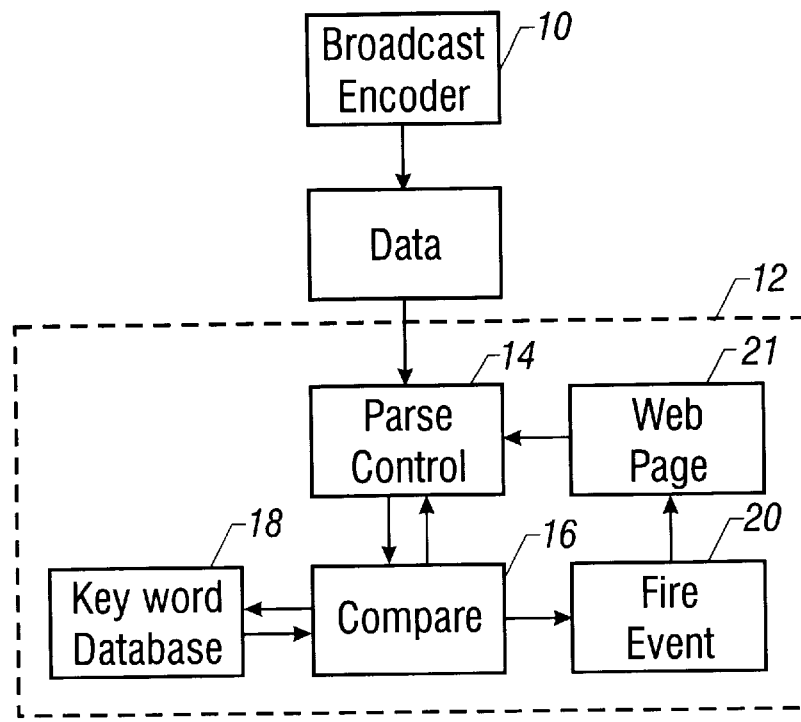
FIG. 1 is a schematic depiction of an interactive broadcast system in accordance with one embodiment of the present invention.

Referring to FIG. 1, an interactive broadcasting system uses a broadcast encoder 10 to interleave web content with television programming. The broadcast encoder may use a variety of conventional transports including television airwave broadcasts by way of the vertical blanking interval (VBI), cable or satellite transmissions. The broadcast is received on a receiver 12 which may, for example, be a computer.

The receiver includes a parse control 14 which parses the closed caption script which is transmitted with the programming information. The closed caption script is created by removing the display command codes. These codes control the display of the closed caption text. For example, they may control the position or color of the text. The closed caption data may be found in assigned lines in the vertical blanking interval in the case of airwave broadcasts or in other places as determined by the broadcaster.

A key word or phrase, which may be programmed by the user, is stored in a database 18. The key word may be a word which the user wants to monitor in the television programming. Since the closed caption data normally represents the audio subject matter of the television program, the key word database may include a word or words which, if used during the broadcast, generates an event.

The word or words in the key word database 13 are then compared (block 16) to the stream of parsed closed caption script to determine whether the key word has been utilized. If there is a match, appropriate action may be taken as indicated in block 20. Otherwise the web content information is simply displayed in accordance with the interactive broadcast protocol.

After the decision is made to fire an event, the particular event that is fired may be determined by a web page 21 which may be received from the broadcast encoder 10. Thus, the broadcaster, for example, may programmably select the event that is generated by software or script transferred to the receiver 12. Alternatively, the event may be programmably selected by the receiver 12 user.

Figure 2:
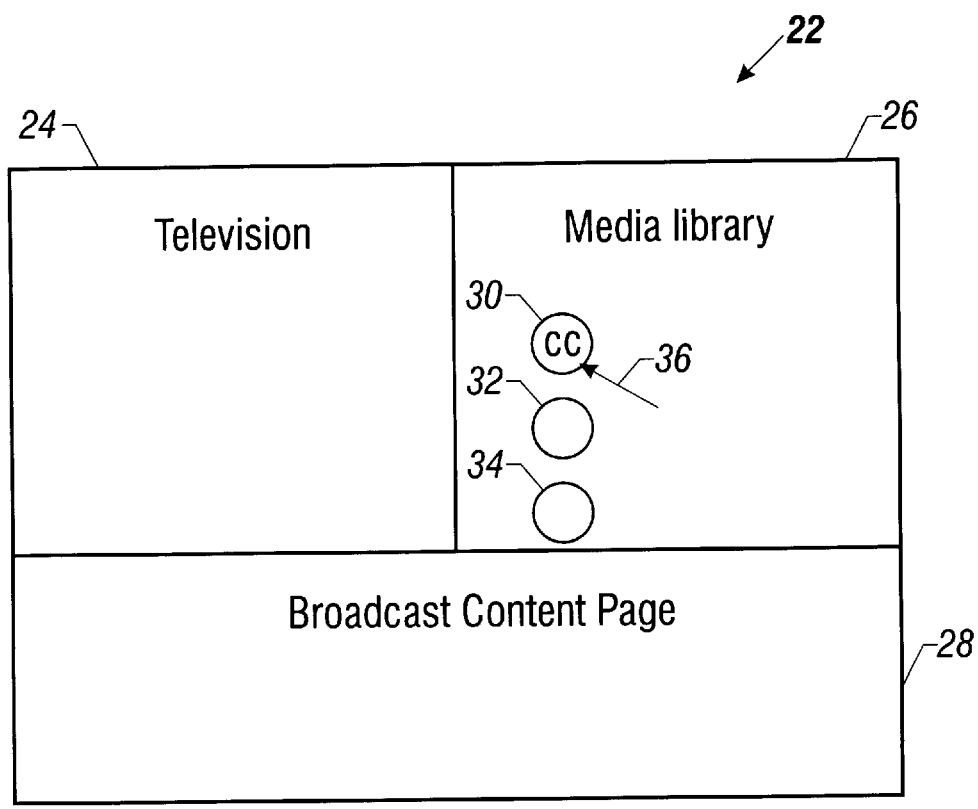
FIG. 2 is an illustrative display screen used in the system shown in FIG. 1.

Referring to FIG. 2, an exemplary interactive broadcast display screen 22 may be broken into a plurality of display screen segments. The segment 24 may display the broadcast television picture. The media library 26 may store web content information which has been simulcast with the television programming. The broadcast content page 28 may display the currently broadcast web content information.

The media library 26 may include a user interface button such as the button 30 which may be clicked on with a mouse arrow 36 to cause the software to provide information to the user. In the example illustrated in FIG. 2, the button 30 is a closed caption button and, when clicked on, allows a stream of real time closed caption text, corresponding to the audio portion of the television broadcast 24, to stream across the media library segment 26. The closed caption text may be displayed in real time in the library 26 so that it does not overlap and interfere with the television display 24. The media library may include a plurality of other buttons such as the buttons 32 and 34.

Figure 3:
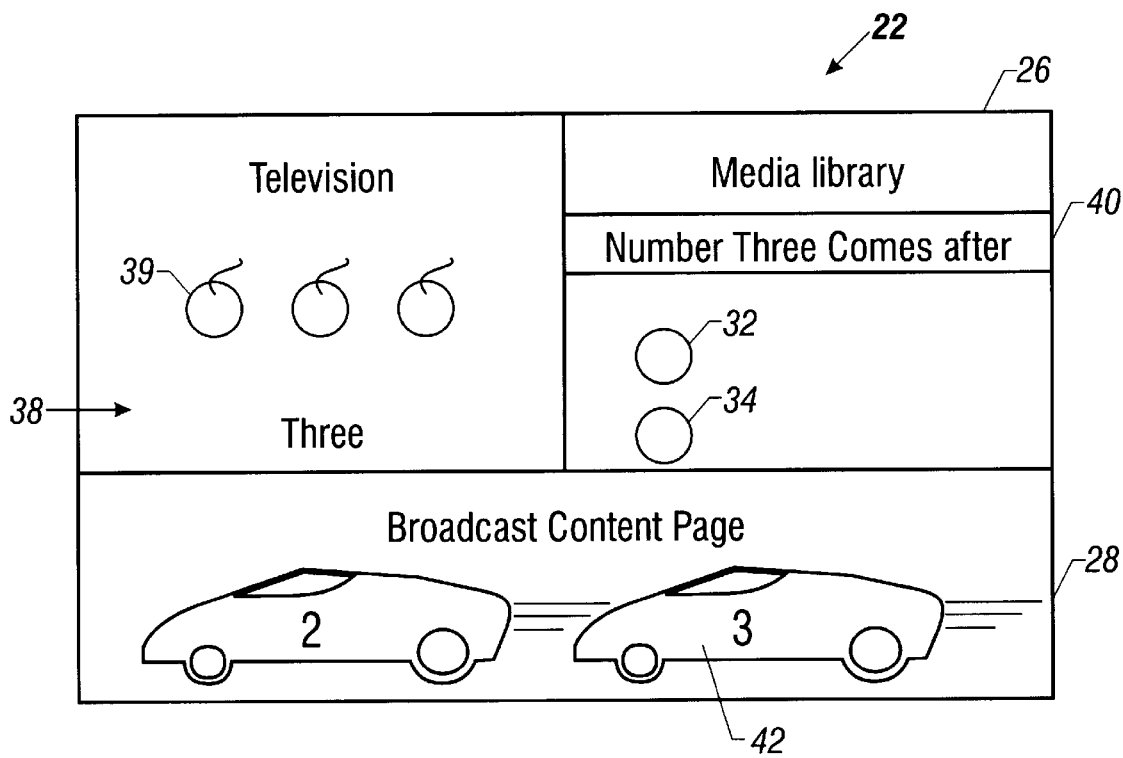
FIG. 3 is another screen used in the system shown in FIG. 1.

Referring now to FIG. 3, an exemplary screen 22 is shown with the media library segment 26 displaying closed caption content in a scrolling banner 40 extending across the media library segment 26. The closed caption information scrolls across the media library segment 26 banner 40. For example, the television display could include three apples 39 on the television segment 24 to illustrate the number "three" 38 in an educational program. On the broadcast content page 28, the concept of the number three coming after the number two could be illustrated, using the automobile animation 42. The audio portion, displayed in text format in the scrolled closed caption banner 40, indicates that the number three comes after the number two. Thus, it can be appreciated that a presentation may be coordinated between the closed caption information, the television display screen, and the corresponding web content page.

By watching for a particular key word, an animation may be implemented whenever the key word is located in the closed caption text. For example, the word "three" could be a key word. When the word "three" is spoken, the animation shown in the web content segment 28 may be implemented. Thus, the user's computer can be programmed to interact with the ongoing audio presentation on the television screen to generate an event, such as the illustrated animation, whenever a certain word is spoken in the audio portion of the television program.

Figure 4:
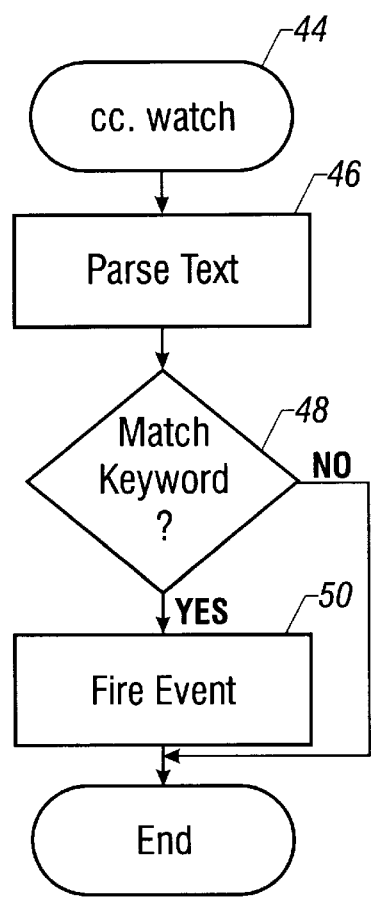
FIG. 4 is a flow chart for the system shown in FIG. 1.

Referring to FIG. 4, a flow chart for the software 44 for implementing reactive closed caption monitoring begins with parsing the closed caption text as indicated in block 46. If a key word is matched, as indicated in diamond 48, an event is fired or generated as shown in block 50. Otherwise no event is fired. The fired event may, for example, be determined by the broadcaster through the web page 21 which may correspond to the broadcast content page 28.

A fired event could be an animation which is implemented when a particular word is uttered in the course of the television broadcast as represented in the closed caption screen. In addition, a number of other events could be programmed into the broadcast, for example by the user. For example, a sound could be fired whenever a touchdown occurs during a football show. A touchdown could be recognized by monitoring and parsing the closed caption text for the word "touchdown". Similarly, a message could be displayed on the television when a match is detected for a particular weather condition, such as a tornado. In such case, the fired event could be to mute the audio on the television, bring the television video to the top of the display, make it full screen and flash a warning message. The same type of action could be implemented in a stock ticker application. Whenever the television program mentions a particular stock, which is preset by the user, the audio could be raised in level so the user would notice and pay attention to the television program.

Thus, a user can pre-program a monitoring service which watches for key words and triggers an event when those key words are broadcast over the television system. This in effect allows the user to do something else during the television program with the expectation that the computer system will monitor the television program and alert the television viewer when an item of particular interest occurs. Both the event which is generated and the key word itself may be programmed by the user.

Conventionally, the closed caption information could be stored in a buffer, for example. Additional closed caption text in excess of the buffer capacity causes the oldest data in the buffer to be discarded.

Figure 5:
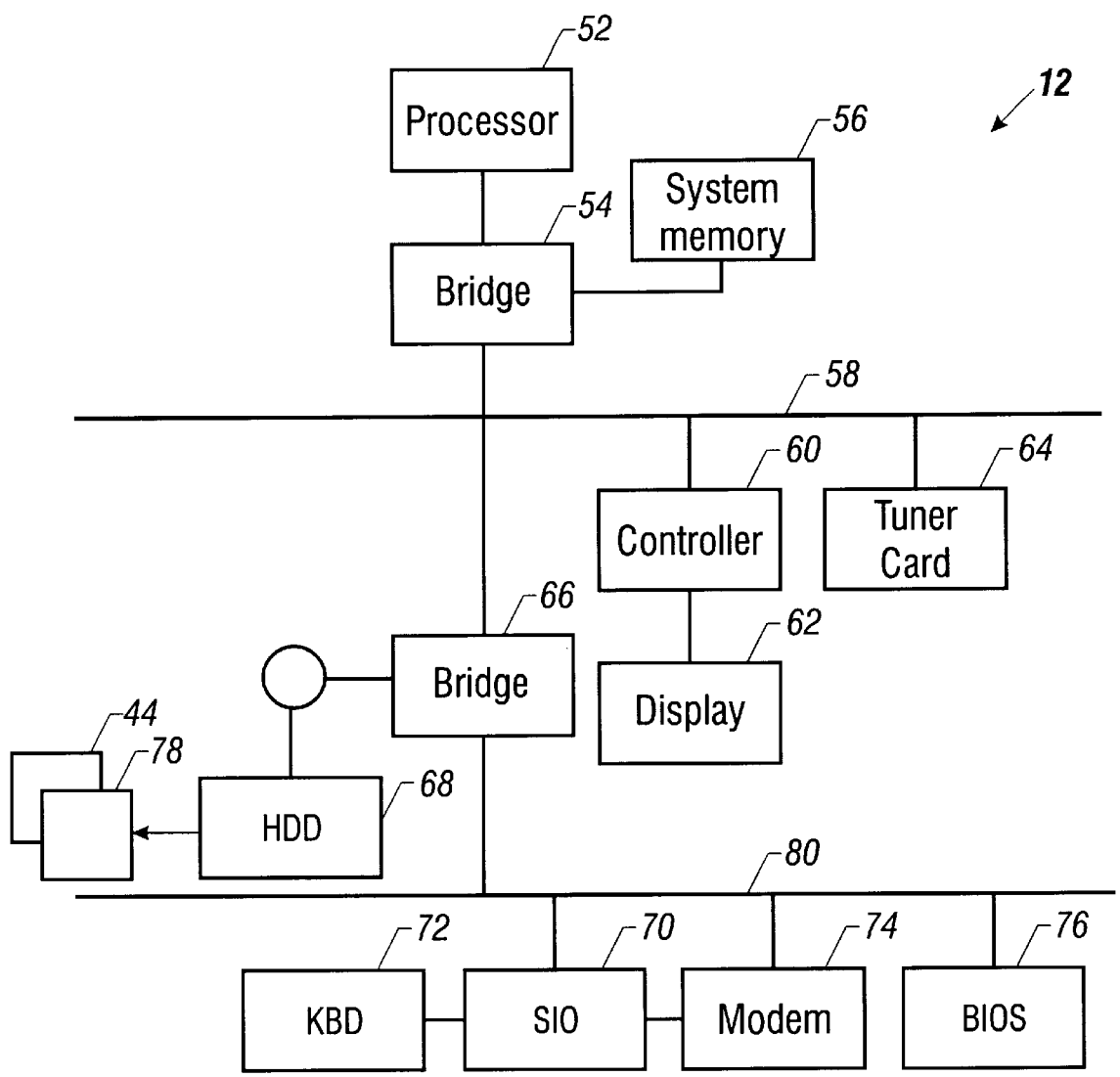
FIG. 5 is a block diagram of an exemplary computer system acting as the receiver in the interactive broadcast system shown in FIG. 1.

Referring to FIG. 5, an exemplary receiver 12 may include a processor 52 which is connected to a north bridge 54. The north bridge may be connected to a system memory 56. The north bridge 54 may be coupled to a bus 58 which is coupled to a display controller 60 and a display 62. A television tuner card 64 may also be coupled to the bus 58. A south bridge 66, coupled to the bus 58, connects to a hard disk drive 68 which may include the software 44 and the interactive broadcast software 78. Software 44 may include a database for storing events and search words.

The bridge 66 may connect a bus 80 which in turn may connect a serial input/output (SIO) device 70. The input/output device 70 may connect, for example, a modem 74 and a keyboard 72. The bus 80 may also connect to a basic input/output system (BIOS) 76. The connection may be direct or indirect.

While the present invention has been described with respect to a limited number of embodiments, those skilled in the art will appreciate numerous modifications and variations therefrom. It is intended that the appended claims cover all such modifications and variations as fall within the true spirit and scope of the present invention.

What is claimed is:

1. A method of monitoring closed caption script accompanying a television program comprising:

receiving software over a television transport;

parsing a closed caption script;

comparing the parsed closed caption script to a search word; and generating a programmably selectable event under control of said software when a word in the closed caption script matches a search word.

2. The method of claim 1 further including changing the audio level when the word in the closed caption script matches a search word.

3. The method of claim 1 including implementing an animation on a television display when a word in the closed caption script matches a search word.

4. The method of claim 1 including displaying a message on a television display upon a match.

5. The method of claim 1 including bringing the video to the top of a television display upon a match.

6. The method of claim 1 including producing a distinct warning upon a match.

7. The method of claim 1 including displaying the closed caption script on a television display.

8. The method of claim 7 including displaying the closed caption script in a separate area which does not overlay the television program.

9. The method of claim 1 including displaying the closed caption text in real time as it is received.

10. The method of claim 1 including allowing the television viewer to programmably select the search word.

11. The method of claim 1 including allowing the television viewer to programmably select the event which is generated upon a match.

12. An article comprising a medium for storing instructions that cause a computer to:

receive a transmission including software;

receive a transmission including closed caption script;

parse the closed caption script;

compare the parsed closed caption script to a search word; and generate an event determined by said software when a word in the closed caption script matches a search word.

13. The article of claim 12 including instructions that cause a computer to display the closed caption script in a separate area which does not overlay the television program.

14. The article of claim 12 including instructions that cause a computer to display the closed captioned script in real time as it is received.

15. The article of claim 12 including instructions that cause a computer to allow the television viewer to programmably select the search word.

16. The article of claim 12 including instructions that cause a computer to allow the television viewer to programmably select the event which is generated upon a search word match.

17. A method of monitoring closed caption data accompanying a television program comprising:

receiving a transmission including software;

receiving a closed captioned data accompanying a television program;

parsing the closed caption data;

comparing the parsed data to a search term; and generating an event determined by said software when the search term matches parsed data.

18. The method of claim 17 including allowing the television viewer to program the event which is generated upon a match.

19. The method of claim 18 including displaying the closed caption script so as not to overlay the television program.

20. The method of claim 17 including displaying the closed caption script in real time as it is received.

21. The method of claim 17 including allowing the television broadcaster to determine the event which is generated upon a match.

* * * * *